United States Patent [19]

Murata et al.

[11] Patent Number: 4,871,404
[45] Date of Patent: Oct. 3, 1989

[54] METHOD FOR PRODUCING AN OPTICAL INFORMATION RECORDING DISK

[75] Inventors: Yasushi Murata; Kunizoh Ogoshi; Fumio Matsui, all of Saitama, Japan

[73] Assignee: Pioneer Electronic Corporation, Tokyo, Japan

[21] Appl. No.: 106,690

[22] Filed: Oct. 13, 1987

[30] Foreign Application Priority Data

Oct. 13, 1986 [JP] Japan ............... 61-243541

[51] Int. Cl.$^4$ ............ B29C 45/14; B29C 65/08; G11B 7/24
[52] U.S. Cl. ............... 156/73.1; 156/275.5; 156/307.3; 264/271.1; 264/328.1; 346/135.1; 346/137; 360/135; 369/282; 369/286; 369/290
[58] Field of Search ............ 156/73.1, 275.5, 307.3; 264/271.1, 328.1; 360/135; 346/135.1, 137; 369/282, 286, 288, 290

[56] References Cited

U.S. PATENT DOCUMENTS

| | | | |
|---|---|---|---|
| 1,821,916 | 9/1931 | Acheson et al. | 369/282 |
| 3,430,966 | 3/1969 | Gregg | 369/286 |
| 4,138,765 | 2/1979 | Yamazaki et al. | 156/73.1 |
| 4,470,137 | 9/1984 | Tago | 369/290 |
| 4,549,922 | 10/1985 | Oishi et al. | 360/135 |
| 4,569,865 | 2/1986 | Placek | 264/328.1 |
| 4,660,119 | 4/1987 | Kato et al. | 360/135 |
| 4,710,913 | 12/1987 | Matsushima et al. | 369/282 |

FOREIGN PATENT DOCUMENTS

| | | |
|---|---|---|
| 0136041 | 4/1985 | European Pat. Off. . |
| 0233644 | 8/1987 | European Pat. Off. . |
| 3228584 | 7/1982 | Fed. Rep. of Germany . |

*Primary Examiner*—Michael Wityshyn
*Attorney, Agent, or Firm*—Sughrue, Mion, Zinn, Macpeak & Seas

[57] ABSTRACT

A method for manufacturing an optical information recording disk having a reduced eccentricity between the center hole of the disk and the recorded track. A transparent circular substrate is provided having a large circular hole. A metal lamination disk member is formed having an outer diameter larger than the inner diameter of the hole in the substrate and an inner diameter smaller than the inner diameter of the hole in the substrate. The metal lamination disk member is placed on the substrate with an adhesive and positioned so that the center hole in the lamination member is concentric relative to the substrate, whereupon the adhesive is hardened. A molded circular plate is then concentrically mounted having a transfer surface on a main surface of the circular substrate through a setting resin in a liquid phase, which is then hardened.

8 Claims, 2 Drawing Sheets

METHOD FOR PRODUCING AN OPTICAL INFORMATION RECORDING DISK

BACKGROUND OF THE INVENTION

The present invention relates to a method for producing an optical information recording disk such as a read-only optical disk, a write-once type optical disk, a read/write optical disk, or the like.

In an optical disk such as a video disk or the like, the radial interval between rows of pits or guide grooves concentrically or spirally formed on a recording surface of the disk, namely, the track pitch, is set at a minute value of about 1.6 μm. When such an optical disk is mounted on a turntable of a reproducing apparatus, the spindle of the turntable is fitted into a center hole of the optical disk. Accordingly, the positioning of the optical disk relative to the spindle is extremely important with respect to the accuracy in rotation of the optical disk. Further, although a tracking servo is provided, if the displacement of the center of the optical disk is large, tracking by the laser beam pickup may be impossible because the range of the tracking servo is exceeded. Accordingly, when the center hole of an optical disk is formed, a highly accurate process is required so as to minimize the amount of displacement or eccentricity of the center point of the center hole from the center point of the recording surface constituted by the concentrically or spirally formed track.

Conventionally, formation of the center hole of an optical disk has been performed by cutting a substrate of a transparent circular plate prepared by injection molding of PMMA resin, PC resin, or the like. The center of the substrate (the center of the spiral of guide grooves) is determined using an optical instrument, and the substrate is bored while being firmly fixed. In the cutting process, however, there has been a problem in that the cutting machine is large in size and the substrate tends to suffer damage on its surface.

Alternatively, a metal mold having a protrusion corresponding to a center hole of an optical disk has sometimes been used so as to directly produce an optical disk having a center hole. In this case, however, there is a problem in that the accuracy is so low that a circular hole with acceptable circularity and concentricity cannot be obtained.

As shown in FIG. 1, there occurs a displacement or gap between a spindle 21 of a transferring apparatus and a substrate 22 in a transferring step of the conventional optical disk manufacturing process, which makes it impossible to correctly transfer the original recording pattern from the surface of a stamper 23 of the transferring apparatus onto the substrate 22 in such a manner as to make the center of the spiral track pattern coincide with the center of the substrate 22.

SUMMARY OF THE INVENTION

It is therefore an object of the present invention to eliminate the foregoing disadvantages in the prior art manufacturing process.

It is another object of the present invention to provide a method of producing an optical disk which is durable and which has a center hole of small eccentricity.

In order to attain the above objects, the method of producing an optical information recording disk according to the present invention comprises the steps of: forming a transparent circular substrate having a large circular center hole; forming a metal lamination disk member having an outer diameter larger than an inner diameter of the large circular center hole and having a small circular center hole with an inner diameter smaller than the inner diameter of the large circular center hole; mounting the metal lamination disk member on a main surface of the circular substrate through an adhesive agent; concentrically positioning the small circular center hole of the metal lamination disk member relative to the circular substrate; hardening the adhesive agent; and concentrically mounting a circular plate mold having a transfer surface on a main surface of the circular substrate through a setting resin in a liquid phase and hardening the setting resin so as to transfer the pattern of the transfer surface.

BRIEF DESCRIPTION OF THE DRAWINGS

The above and other objects of the present invention will be apparent from the following detailed description taken in conjunction with the accompanying drawings, in which.

DESCRIPTION OF THE PREFERRED EMBODIMENTS

Preferred embodiments of the present invention will be described hereunder in detail with reference to the accompanying drawings.

First, a substrate in the form of a transparent circular plate having a large circular center hole at its center portion is formed of PMMA resin through injection molding. The inner diameter of the large circular center hole is smaller than the outer diameter of a metal lamination disk member 1 which is formed in the next step.

Figure 1:
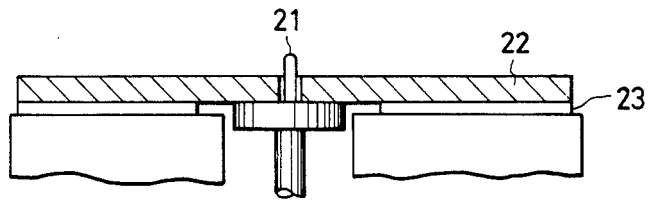
FIG. 1 is a schematic sectional view provided for explaining the conventional transferring step.
Figure 2:
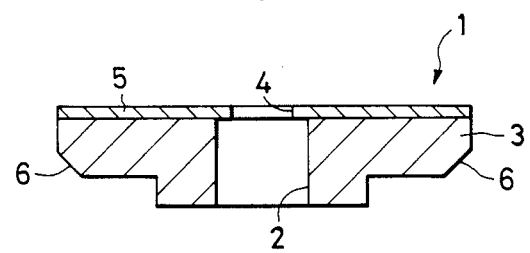
FIG. 2 is an enlarged sectional view showing a metal lamination disk.

Next, the metal lamination disk member 1 having a diameter of 25 mm, as shown in the cross section of FIG. 2, is formed. The metal lamination disk member 1 is constituted by a center support 3 of PMMA resin and a circular metal plate 5. The center support 3 is constituted by a circular plate portion having a center hole 2 and a projecting cylindrical portion surrounding the center hole 2. The circular metal plate 5, which is fixed to a flat main surface of the center support 3, has a small circular hole 4 which is subsequently formed into the center hole of the optical disk. The center support 3 is formed of PMMA resin through injection molding.

The joining between the circular metal plate 5 and the center support 3 is performed, for example, by an insert injection method in which a metal plate is inserted into a metal mold having the desired shape of the center support and resin is injected into the metal mold so as to mold the center support. Otherwise, an ultrasonic welding method may be used in which a molded center support and a metal plate are stacked together with the flat main surface of the former containing a main surface of the latter, and ultrasonic waves are applied to the center support and the metal plate from opposite sides to thereby cause the center support and the metal plate to adhere to each other. In this process, the horn of an ultrasonic wave generator should contact both the center support and the metal plate. Still further, it is possible to employ an adhesive agent method in which a center support and a metal plate are fixed together through an adhesive agent and then the adhesive agent is hardened. Also, an adhesive tape method can be used in which a flat main surface of the center support is adhered to a main surface of a metal plate using a double-sided adhesive tape.

The circular metal plate 5 is formed so as to have a diameter larger than that of the large circular center hole of a substrate 7 (FIGS. 3A to 3E). The inner diameter of the center hole 2 of the center support 3 is made larger than that of the small circular center hole 4 in the metal plate 5 so as to use the center hole 4 of the metal plate 5 as a small circular center hole for the metal lamination disk member 1. Accordingly, the small circular center hole 4 of the metal plate 5 should be formed so as to be perfectly circular since the small circular center hole 4 is used as a through hole which receives the spindle of a transfer apparatus when the center of the metal lamination disk member 1 is aligned with the center of a spiral of guide grooves on a stamper in a subsequent transfer step. Also, the spindle of the clamping mechanism of the reproducing apparatus will pass through this hole after completion of the optical disk when it is played.

Further, in the other main surface of the center support 3 in opposition to the metal plate 5 of the metal lamination disk member 1, it is preferable to cut off a circumferential corner portion of the metal lamination disk member 1 to form a slanting circumferential edge portion 6 so that the adhesive agent is prevented from flowing out from the member 1 and fouling the surface of the substrate when the substrate is pressed onto the metal lamination disk member 1.

FIGS. 3A to 3E are schematic cross sections showing the steps of fixing the metal lamination disk member 1 onto the substrate in the process according to this embodiment of the present invention.

Figure 3A:
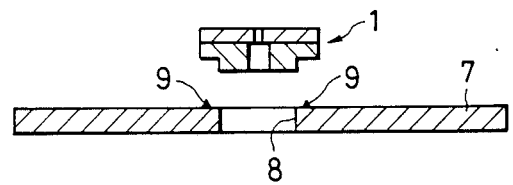
FIGS. 3A to 3E are a series of schematic sectional views used for explaining the manufacturing process according to the present invention.

As shown in FIG. 3A, a first adhesive agent 9 is applied around the circumference of a large circular center hole 8 of a substrate 7 prepared in advance.

Figure 3B:
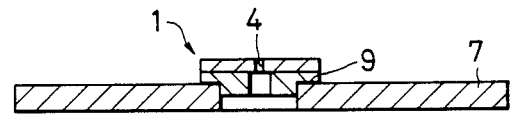

Next, as shown in FIG. 3B, the metal lamination disk member 1, prepared in the manner described above, is mounted on the substrate 7 using the adhesive agent 9 and positioned before the adhesive agent 9 is hardened so that the center of the center hole 4 of the metal lamination disk member 1 coincides with the center of the substrate 7. Then, the adhesive agent 9 is hardened.

For the adhesive agent 9, it is preferable to use an adhesive agent belonging to the same group as the substrate 7 and the center support 3 in order to increase the fixing force. An acrylic adhesive agent is used in this embodiment.

Figure 3C:
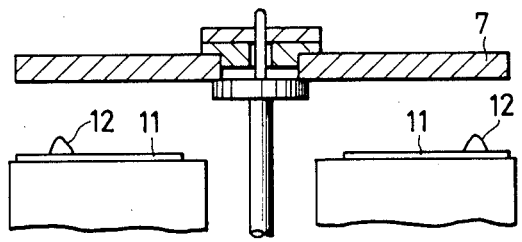

Next, as shown in FIG. 3C, ultraviolet-setting resin 12 in a liquid phase is applied onto a stamper 11 of a transfer apparatus, similarly to the conventional transfer method.

Figure 3D:
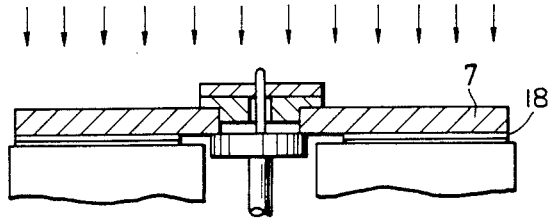

As shown in FIG. 3D, the substrate 7 carrying the metal lamination disk member 1 thereon is concentrically mounted on the stamper 11 using the ultraviolet setting resin 12 in a liquid phase and positioned on the substrate 7 relative to the stamper 11. Then, the ultraviolet-setting resin 12 is irradiated with ultraviolet rays from the substrate side, in the direction indicated by arrows in FIG. 3D, to thereby harden the ultraviolet-setting resin 12 and transfer the pattern of a guide groove layer 18 constituted by the ultraviolet-setting resin onto a main surface of the substrate 7.

Figure 3E:
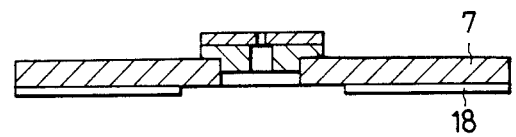

Subsequently, as shown in FIG. 3E, the substrate 7 is separated from the stamper 11 so as to complete the substrate on which the guide groove layer 18 has been formed.

Thereafter, a signal recording layer is formed on the guide groove side surface of the substrate 7 together with members such as a spacer and a protective plate to thereby complete the optical disk.

According to the invention, it is not necessary to provide a step of cutting the center hole or the outer circumference of the substrate, thus making it possible to produce an optical disk having a perfectly accurate circular center hole with a small eccentricity.

Further, the thus-obtained optical disk has a metal layer portion, and therefore it is possible to use a magnetic clamping technique in the reproducing apparatus. Such a clamping mechanism can be reduced in size compared with other clamping mechanisms.

As described above, in the disk manufacturing method according to the present invention, the substrate and the metal lamination disk member are formed separately from each other, and the two members can be joined over the entirety of their main surfaces so that the center hole can be drilled in the metal portion of the metal lamination disk member with a high accuracy, thereby making it possible to obtain an optical disk having a circular center hole with a small eccentricity.

What is claimed is:

1. A method of producing an optical information recording disk comprising the steps of:

forming a transparent circular substrate having a circular center substrate hole;

forming a metal lamination disk member having an outer diameter larger than the diameter of said circular center substrate hole and having a circular center mounting hole of a diameter smaller than said diameter of said circular center substrate hole, said mounting hole being formed of highly accurate dimensions such that said metal lamination disk member can be mounted on and maintained in high positional accuracy with respect to a mounting spindle of a stamper;

mounting said metal lamination disk member on a main surface of said circular substrate through an adhesive agent;

concentrically positioning said circular center mounting hole of said metal lamination disk member relative to said circular substrate;

hardening said adhesive agent;

concentrically mounting, relative to said housing hole, a main surface of said circular substrate on said stamper having a transfer surface, and forming optical information tracks concentric with said mounting hole by using a setting resin in a liquid phase and hardening said setting resin so as to transfer a pattern of said transfer surface; and wherein said metal lamination disk member comprises a circular support having a center hole and a projecting cylindrical portion surrounding said center hole and a circular metal plate fixed to a flat main surface of said circular support, said metal plate having a smaller circular hole than said center hole of said circular support, said smaller hole of said metal plate corresponding to said circular center mounting hole.

2. The method of producing an optical information recording disk of claim 1, where a material of said circular support is the same as a material of said circular substrate.

3. The method of producing an optical information recording disk of claim 1, wherein said metal lamination disk member is produced by a process comprising the steps of: placing said circular metal plate in a mold having the desired shape of said metal lamination disk member, and injecting resin into said mold to mold said metal lamination disk member.

4. The method of producing an optical information recording disk of claim 1, wherein said metal lamination disk member is produced by a process comprising the steps of: stacking said circular metal plate and said circular support; and ultrasonically bonding said metal plate to said circular support.

5. The method for producing an optical information recording disk of claim 4, wherein, in said step of ultrasonically bonding, ultrasonic waves are applied from opposite sides of the stacked circular metal plate and circular support.

6. The method of producing an optical information recording disk of claim 1, wherein said metal lamination disk member is produced by a process comprising the steps of: stacking said circular metal plate and said circular support with an adhesive therebetween; and hardening said adhesive.

7. The method of producing an optical information recording disk of claim 2, wherein said metal lamination disk member has a slanting circumferential edge portion for receiving an excess of said adhesive agent.

8. The method of producing an optical information recording disk of claim 1, wherein said circular metal plate is made of a magnetic material.

* * * * *